(12) United States Patent
Stama

(10) Patent No.: US 8,163,142 B1
(45) Date of Patent: Apr. 24, 2012

(54) HYDROGEN SYSTEM FOR INTERNAL COMBUSTION ENGINE

(76) Inventor: Giulio Stama, Miami, FL (US)

( * ) Notice: Subject to any disclaimer, the term of this patent is extended or adjusted under 35 U.S.C. 154(b) by 586 days.

(21) Appl. No.: 12/419,693

(22) Filed: Apr. 7, 2009

(51) Int. Cl.
C25B 9/00 (2006.01)
C25B 1/06 (2006.01)
C25B 1/04 (2006.01)

(52) U.S. Cl. ........ 204/278; 204/237; 204/270; 204/271; 204/274; 204/278.5; 205/628; 123/3; 123/DIG. 12

(58) Field of Classification Search .................. 204/278, 204/271, 274
See application file for complete search history.

(56) References Cited

U.S. PATENT DOCUMENTS

| | | | | |
|---|---|---|---|---|
| 4,124,463 A * | 11/1978 | Blue | | 205/630 |
| 4,368,696 A * | 1/1983 | Reinhardt | | 123/3 |
| 4,425,216 A * | 1/1984 | Neymeyer | | 204/270 |
| 4,442,801 A * | 4/1984 | Glynn et al. | | 123/3 |
| 4,450,060 A * | 5/1984 | Gonzalez | | 204/268 |
| 5,231,954 A * | 8/1993 | Stowe | | 123/3 |
| 5,272,871 A | 12/1993 | Oshima et al. | | |
| 5,399,251 A * | 3/1995 | Nakamats | | 204/262 |
| 6,257,175 B1 * | 7/2001 | Mosher et al. | | 123/3 |
| 6,336,430 B2 | 1/2002 | de Souza et al. | | |
| 6,464,854 B2 | 10/2002 | Andrews et al. | | |
| 6,698,389 B2 | 3/2004 | Andrews et al. | | |
| 6,790,324 B2 | 9/2004 | Chambers | | |
| 6,977,120 B2 | 12/2005 | Chou et al. | | |
| 7,014,740 B2 * | 3/2006 | Kim | | 204/278.5 |
| 7,240,641 B2 | 7/2007 | Balan et al. | | |
| 7,458,368 B1 | 12/2008 | Huffman | | |
| 7,459,071 B2 | 12/2008 | Omasa | | |
| 2003/0205482 A1 * | 11/2003 | Allen | | 205/630 |
| 2004/0065542 A1 | 4/2004 | Fairfull et al. | | |
| 2005/0126515 A1 * | 6/2005 | Balan et al. | | 123/3 |
| 2005/0199509 A1 * | 9/2005 | Ross | | 205/633 |
| 2005/0217991 A1 | 10/2005 | Dahlquist, Jr. | | |
| 2008/0202942 A1 | 8/2008 | Wilkinson et al. | | |
| 2008/0257751 A1 | 10/2008 | Smola et al. | | |

* cited by examiner

Primary Examiner — Harry D Wilkins, III
Assistant Examiner — Bryan D. Ripa
(74) Attorney, Agent, or Firm — Albert Bordas, P.A.

(57) ABSTRACT

A hydrogen system for internal combustion engines, comprising a housing assembly having at least three internal chambers divided by at least two dividing plates. The two dividing plates include a lower dividing plate and an upper dividing plate. Each comprises a plurality of through holes to allow aqueous solution to flow and circulate through the three internal chambers. A hydrogen generator is mounted onto the housing assembly at a predetermined angle. The hydrogen generator comprises a first predetermined number of negative charged plates, a second predetermined number of neutral plates, and a third predetermined number of positive charged plates. The hydrogen generator generates oxygen and hydrogen gas for use in an internal combustion engine to improve combustion efficiency and to decrease emissions. The hydrogen generator serves as an electrolysis cell to generate the oxygen and hydrogen gas with electric current from a power source being passed through the aqueous solution.

20 Claims, 4 Drawing Sheets

HYDROGEN SYSTEM FOR INTERNAL COMBUSTION ENGINE

BACKGROUND OF THE INVENTION

1. Field of the Invention

The present invention relates to hydrogen generating devices, and more particularly, to a hydrogen system for internal combustion engines.

2. Description of the Related Art

An internal combustion engine is an engine in which combustion of a fuel occurs with an oxidizer; usually air, in a combustion chamber. In the internal combustion engine, the expansion of high temperature and pressure gases that are produced by combustion, directly apply force to a movable component of the engine, such as pistons or turbine blades to generate useful mechanical energy. The term internal combustion engine often refers to an engine in which combustion is intermittent, such as four-stroke and two-stroke piston engines, along with variants, such as the Wankel rotary engine. A large number of different designs for internal combustion engines have been developed and built, with a variety of different strengths and weaknesses.

While there have been and still are many stationary applications, the real strength of internal combustion engines is in mobile applications and they completely dominate as a power supply for vehicles including automobiles, trucks, sport utility vehicles, and motorcycles; aircraft; and boats. The internal combustion engine is most commonly used for mobile propulsion of the above-mentioned, and generally uses fossil fuel, mainly petroleum for combustion. However, there is a need to improve engine efficiencies to reduce fossil fuel consumption. Hydrogen gas may be introduced into an engine to improve fuel combustion, resulting in less fossil fuel demand and overall improved engine efficiency.

Electrolysis of water is the decomposition of water ($H_2O$) into oxygen ($O_2$) and hydrogen gas ($H_2$) due to an electric current being passed through the water. Prior art teaches that an electrical power source is connected to two electrodes, or two plates, (typically made from some inert metal such as platinum or stainless steel) which are placed in the water. Hydrogen will appear at the cathode (the negatively charged electrode, where electrons are pumped into the water), and oxygen will appear at the anode (the positively charged electrode). The generated amount of hydrogen is twice the amount of oxygen, and both are proportional to the total electrical charge that was sent through the water. Electrolysis is sped up dramatically by adding an electrolyte (such as a salt, an acid or a base).

Applicant believes that one of the closest references to the present invention corresponds to U.S. Patent Application Publication No. 20080257751, published on Oct. 23, 2008 to Smola, et al. for an enhanced device for generating hydrogen for use in internal combustion engines. However, it differs from the present invention because Smola, et al. teach an electrolysis conversion system for converting water into hydrogen and oxygen, including a housing in which are housed electrodes. The electrodes are immersed in an electrolyte and are connected to positive and negative sides of an energy source. The housing is a non-conductive material that has chambers to separate the hydrogen and the oxygen. Smola, et al. further disclose a method of utilizing an electrolyzer in conjunction with a fuel system of an internal combustion engine to improve the efficiency of internal combustion engines.

Applicant believes that another reference corresponds to U.S. Patent Application Publication No. 20080202942, published on Aug. 28, 2008 to Wilkinson, et al. for a method and apparatus for converting water into hydrogen and oxygen for a heat and/or fuel source. However, it differs from the present invention because Wilkinson, et al. teach a water separation apparatus to separate hydrogen and oxygen from water that includes a reaction chamber containing a plurality of spaced apart conductive plates, a positive electrical terminal electrically connected to one of the conductive plates, and a negative electrical terminal electrically connected to another of the conductive plates. A mixture of water and a catalyst is placed in the chamber and in contact with the plates. A non-conductive adjuster plate is provided to separate the chamber into a front chamber and a rear chamber, and may include at least one fluid passageway. A portion of the plates is disposed in the front chamber and a portion of the plates is disposed in the rear chamber. The adjuster plate may include a moveable member adapted to adjust the cross-sectional area of fluid passageway and thus the cross-sectional area of fluid communication between the front and rear chambers. The apparatus may include a collector-separator to collect gases from the reaction chamber and separate any remaining water from the gases. The separated water is returned to the reaction chamber, and the hydrogen and oxygen gases are transmitted to a bubbler assembly which functions to prevent any flashback from igniting the gases in the reaction chamber or collector-separator.

Applicant believes that another reference corresponds to U.S. Patent Application Publication No. 20050217991, published on Oct. 6, 2005 to Dahlquist, Jr. for a fuel system for internal combustion engine. However, it differs from the present invention because Dahlquist, Jr. teaches a fuel system for generating hydrogen and oxygen for use in an internal combustion engine to improve combustion efficiency, horsepower, and torque; and to decrease emissions. The fuel system has at least one electrolysis cell for generating hydrogen and oxygen by electrolysis of an aqueous solution, a power source for providing electrical power to the electrolysis cell, and a heating and cooling system for maintaining the temperature of the electrolysis cell in a desired range to obtain the desired quantities of hydrogen and oxygen for operation of the internal combustion engine. The invention also includes an electrode array of a plurality of spaced apart electrodes for use in this fuel system and a nonconductive support connected to each of the electrodes to hold the electrodes in place, while leaving adequate room around the electrodes to allow free flow of the aqueous solution between the electrodes. High purity electrolyte and substantially non-reactive electrodes result in improved electrolysis.

Applicant believes that another reference corresponds to U.S. Patent Application Publication No. 20040065542, published on Apr. 8, 2004 to Fairfull, et al. for a hydrogen generator. However, it differs from the present invention because Fairfull, et al. teach a hydrogen generator for supplying hydrogen and/or oxygen to an internal combustion engine. A generator comprises a housing, and a base unit is secured within the housing. The base unit has integral therewith first mounting means for an electrolytic cell, second mounting means for a replaceable liquid reservoir, and a conduit between the first and second mounting means. An electrolytic cell is mounted in the first mounting means. The cell has a liquid inlet and a gas outlet, and connectors for electrical connection to an external source of energy. A controller unit is connected to the cell and comprises a central processing unit and a series of sensors for sensing pressure, temperature and liquid level in the cell. The controller controls operation of the cell responsive to sensor output.

Applicant believes that another reference corresponds to U.S. Pat. No. 7,459,071 issued to Omasa on Dec. 2, 2008 for a hydrogen-oxygen gas generator and method of generating hydrogen-oxygen gas using the generator. However, it differs from the present invention because Omasa teaches a hydrogen-oxygen gas generator comprising an electrolytic cell. An electrode group is formed from an anode and a cathode mutually installed in that electrolytic cell. A power supply applies a voltage across the anode and cathode, and gas trapping means collect the hydrogen-oxygen gas generated by electrolyzing the electrolyte fluid. In addition, there are vibration-stirring means. The gas trapping means is comprised of a lid member installed on the electrolytic cell, a hydrogen-gas extraction tube connecting to the hydrogen-oxygen gas extraction outlet of that lid member. The vibration-stirring means is for stirring and agitating the electrolytic fluid supported by support tables. The distance between the adjacent positive electrode and negative electrode within the electrode group is set within a range of 1 to 20 millimeters. The vibration-stirring means is comprised of vibrating motors vibrating at 10 to 200 Hertz, and vibrating blades vibrating within the electrolytic cell and unable to rotate are attached to a vibrating rod linked to the vibrating motors.

Applicant believes that another reference corresponds to U.S. Pat. No. 7,458,368 issued to Huffman on Dec. 2, 2008 for engine fuel efficiency improvements. However, it differs from the present invention because Huffman teaches a system for increasing the fuel efficiency of a vehicle of the type having an internal combustion engine, a battery, a vacuum line, and a fuel line that feeds fuel to the engine. The system comprises a hydrogen gas generator and a vacuum regulator. A vacuum regulator is in fluid communication with the vacuum line of the vehicle and an output line of the gas generator. The vacuum regulator includes a vacuum pressure adjustment means for controlling the amount of hydrogen gas that is introduced into the vacuum line of the vehicle. In use, hydrogen gas is introduced into the vehicle vacuum line and then into the engine where it is mixed with the fuel from the fuel line and ambient air. The hydrogen gas increases the atomization of the fuel for more efficient burning thereof in the engine. A fuel additive including an acetone-based compound, a xylene-based compound, and an upper cylinder lubricant may be mixed with the hydrogen gas to further atomize the fuel. An oxygen sensor signal generator that generates a bypass signal replicates the output of a vehicle oxygen sensor under normal operating conductions to keep the air mixture of the engine unaffected. The system may additional include at least one fuel heating means fixed to a high-temperature portion of the engine, such that the fuel is heated before being introduced into the engine so as to further increase atomization of the fuel for more efficient burning thereof in the engine.

Applicant believes that another reference corresponds to U.S. Pat. No. 7,240,641 issued to Balan, et al. on Jul. 10, 2007 for a hydrogen generating apparatus and components therefor. However, it differs from the present invention because Balan, et al. teach a hydrogen generating system for use in internal combustion engines for increasing the efficiency of the engine and decreasing emissions from the engine. The hydrogen generating system has an electrolysis cell for generating hydrogen and oxygen gases by electrolysis of an aqueous solution, a power source for providing electrical power to the electrolysis cell, an outlet flow means for introducing the generated gases into the intake manifold system of an internal combustion engine, a monitoring means for monitoring the operating conditions of the hydrogen generating system, and a control means connected to the monitoring means for controlling the operation of the hydrogen generating system in response to the monitoring means.

Applicant believes that another reference corresponds to U.S. Pat. No. 6,977,120 issued to Chou, et al. on Dec. 20, 2005 for a hydrogen/oxygen generating system with temperature control. However, it differs from the present invention because Chou, et al. teach a mixed hydrogen-oxygen fuel generator system using an electrolytic solution to generate gaseous hydrogen-oxygen fuel through the electrolysis of water. This generator system includes: at least one electrolytic cell with multiple metallic plates used as an internal isolation system in which two of the plates separately connect to both the positive and negative terminal of a DC circuit. These plates are used for the electrolysis of the electrolytic solution in the cell(s) to produce, under pressure, mixed hydrogen-oxygen fuel. The apparatus also includes a cooling system containing a water cooling tank in which there are two zones: one is the electrolytic solution circulation coil and the another is a water circulation zone. The cooler provides the circulating, cooling water used to adjust the temperature of the operating cell and of the electrolyte solution to within a given temperature range in order to ensure that the cell is not affected by excessively elevated temperatures that can stop operations due to cell overheating. Another effect of this cooling system is to precipitate moisture out of the generated gas products. The ignition flame temperature of the gaseous fuel produced can be adjusted for specific applications by passage of the hydrogen/oxygen gas stream through a temperature-control fluid. Thus, continuous 24-hour operation can be achieved along with better gas production efficiency and fuel cell energy generation.

Applicant believes that another reference corresponds to U.S. Pat. No. 6,790,324 issued to Chambers on Sep. 14, 2004 for a hydrogen producing apparatus. However, it differs from the present invention because Chambers teaches an apparatus for producing orthohydrogen and/or parahydrogen. The apparatus includes a container holding water and at least one pair of closely-spaced electrodes arranged within the container and submerged in the water. A first power supply provides a particular first pulsed signal to the electrodes. A coil may also be arranged within the container and submerged in the water if the production of parahydrogen is also required. A second power supply provides a second pulsed signal to the coil through a switch to apply energy to the water. When the second power supply is disconnected from the coil by the switch and only the electrodes receive a pulsed signal, then orthohydrogen can be produced. When the second power supply is connected to the coil and both the electrodes and coil receive pulsed signals, then the first and second pulsed signals can be controlled to produce parahydrogen. The container is self-pressurized and the water within the container requires no chemical catalyst to efficiently produce the orthohydrogen and/or parahydrogen. Heat is not generated, and bubbles do not form on the electrodes.

Applicant believes that another reference corresponds to U.S. Pat. No. 6,698,389 issued to Andrews, et al. on Mar. 2, 2004 for an electrolyzer for internal combustion engine. However, it differs from the present invention because Andrews, et al. teach a method and apparatus for chemically heating one or more components of, or intake air flowing to, an internal combustion engine by feeding hydrogen to a catalyst. Condensation of fuels on cold engine cylinder walls during and after cold start-ups is prevented, thereby reducing wear on the engine. A method and apparatus reduces pollutants commonly occurring during cold start-up of combustion engines by heating components of, or intake air flowing to, a combustion engine, in order to quickly warm the engine and its catalytic converter to operating temperatures. Preferably, the hydrogen is supplied from an electrolyzer or other on-board source of hydrogen and the hydrogen and a source of oxygen are provided to the catalyst resulting in exothermic oxidation of hydrogen to heat the air intake or other components of the engine. Preheating systems for one or more of the air intake, the fuel, the engine oil, the block, the battery and the catalytic converter are also included.

Applicant believes that another reference corresponds to U.S. Pat. No. 6,464,854 issued to Andrews, et al. on Oct. 15, 2002 for water sources for automotive electrolyzers. However, it differs from the present invention because Andrews, et al. teach a self-replenishing liquid water source onboard an automobile for supplying liquid water to an electrolyzer, such as an on-board hydrogen generator useful for the suppression of unwanted emissions. Passive means of water collection for reliable replenishment occur with operations of the automobile itself. Condensation from the engine exhaust-gas occurs by cooling a region of the exhaust system using cooling fluid from the engine coolant system. The cooling fluid is circulated during a period following the engine cold start event when the heat load on the engine coolant system is low.

Applicant believes that another reference corresponds to U.S. Pat. No. 6,336,430 issued to de Souza, et al. on Jan. 8, 2002 for a hydrogen generating apparatus. However, it differs from the present invention because de Souza, et al. teach a hydrogen generating system for use in internal combustion engines for increasing the efficiency of the engine and decreasing emissions from the engine. The hydrogen generating system has an electrolysis cell for generating hydrogen and oxygen gases by electrolysis of an aqueous solution, a power source for providing electrical power to the electrolysis cell, an outlet flow means for introducing the generated gases into the intake manifold system of an internal combustion engine, a monitoring means for monitoring the operating conditions of the hydrogen generating system, and a control means connected to the monitoring means for controlling the operation of the hydrogen generating system in response to the monitoring means. A controller controls a hydrogen generating system for use in an internal combustion engine for increasing the efficiency of the engine and decreasing emissions from the engine. The controller has at least one interface means for receiving information on the operating conditions of the hydrogen generating system, at least one control means for controlling a parameter of the hydrogen generating system, and a logic circuit connected to the interface means and control means for providing instructions to the control means in response to the information received from the interface means.

Applicant believes that another reference corresponds to U.S. Pat. No. 5,272,871 issued to Oshima, et al. on Dec. 28, 1993 for a method and apparatus for reducing nitrogen oxides from internal combustion engine. However, it differs from the present invention because Oshima, et al. teach hydrogen gas from a hydrogen generator, which creates hydrogen gas by the electrolysis of water or water vapor, at the entrance to a catalyzer provided in an exhaust line. The catalyzer performs a catalytic reaction between hydrogen gas and nitrogen oxides to achieve decomposition into nitrogen gas and water vapor in the exhaust from an internal combustion engine. The nitrogen oxides are directly reduced with said hydrogen gas in a low temperature atmosphere not higher than 350 degrees Centigrade to achieve efficient reduction in the nitrogen oxides. Nitrogen oxides in the exhaust from a lean burnt engine or a diesel engine can be effectively reduced irrespective of the concentration of oxygen gas in the exhaust without impairing the good fuel economy of those engines.

Other patents describing the closest subject matter provide for a number of more or less complicated features that fail to solve the problem in an efficient and economical way. None of these patents suggest the novel features of the present invention.

SUMMARY OF THE INVENTION

The instant invention is a hydrogen system for internal combustion engines, comprising a housing assembly having at least three internal chambers divided by at least two dividing plates. The two dividing plates include a lower dividing plate and an upper dividing plate. Each comprises a plurality of through holes to allow an aqueous solution to flow and circulate through the three internal chambers. A hydrogen generator is mounted onto the housing assembly at a predetermined angle. The hydrogen generator comprises a first predetermined number of negative charged plates, a second predetermined number of neutral plates, and a third predetermined number of positive charged plates. The hydrogen generator generates oxygen and hydrogen gas for use in an internal combustion engine to improve combustion efficiency and to decrease emissions. The hydrogen generator serves as an electrolysis cell to generate the oxygen and hydrogen gas with electric current from a power source being passed through the aqueous solution.

The first predetermined number of negative charged plates, second predetermined number of neutral plates, and third predetermined number of positive charged plates all comprise first and second diagonal edges. The first and second diagonal edges are positioned diagonally opposite to each other.

The hydrogen generator comprises a first wall. The first predetermined number of negative charged plates, the second predetermined number of neutral plates, and the third predetermined number of positive charged plates is all are fixed onto a first interior face of the first wall. The hydrogen generator comprises a second wall. The first predetermined number of negative charged plates, the second predetermined number of neutral plates, and the third predetermined number of positive charged plates is all are fixed onto a second interior face of the second wall. The hydrogen generator comprises a third wall. The first predetermined number of negative charged plates, the second predetermined number of neutral plates, and the third predetermined number of positive charged plates is a first predetermined distance from the third wall. The hydrogen generator comprises a fourth wall. The first predetermined number of negative charged plates, the second predetermined number of neutral plates, and the third predetermined number of positive charged plates is a second predetermined distance from the fourth wall.

The hydrogen generator comprises an inlet positioned adjacent to the first diagonal edge, and an outlet positioned adjacent to the second diagonal edge. The hydrogen generator comprises a first connecting tube extending from the inlet to the housing assembly. The housing assembly comprises a second connecting tube extending from the housing assembly to the outlet, and an outlet pipe that connects to the internal combustion engine. The at least three internal chambers are a cooling chamber positioned below a filter chamber that is positioned below an upper chamber. The housing assembly comprises an air pipe that extends downwardly through the upper chamber, through the filter chamber and to the cooling chamber. The air pipe coils or bends in shape to increase its total length within the cooling chamber, the air pipe contains ambient air to cool the aqueous solution within the housing assembly, and more specifically within the cooling chamber. The filter chamber is positioned in between the lower dividing plate and the upper dividing plate, and it houses a filter to trap foreign matter that accumulates or develops within the aqueous solution as warmer aqueous solution circulates upwardly from the cooling chamber to the upper chamber, and the upper chamber comprises a diverter.

It is therefore one of the main objects of the present invention to provide a hydrogen system for internal combustion engines that increases the atomization of fuel with hydrogen gas for more efficient burning thereof in the engine.

It is another object of this invention to provide a hydrogen system for internal combustion engines that reduces carbon build-up.

It is another object of this invention to provide a hydrogen system for internal combustion engines that reduces polluting carbon emissions as result of the combustion process.

It is another object of this invention to provide a hydrogen system for internal combustion engines that can be installed onto existing combustion engines in vehicles, as well as new combustion engines.

It is another object of this invention to provide a hydrogen system for internal combustion engines that is volumetrically efficient.

It is yet another object of this invention to provide such a system that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
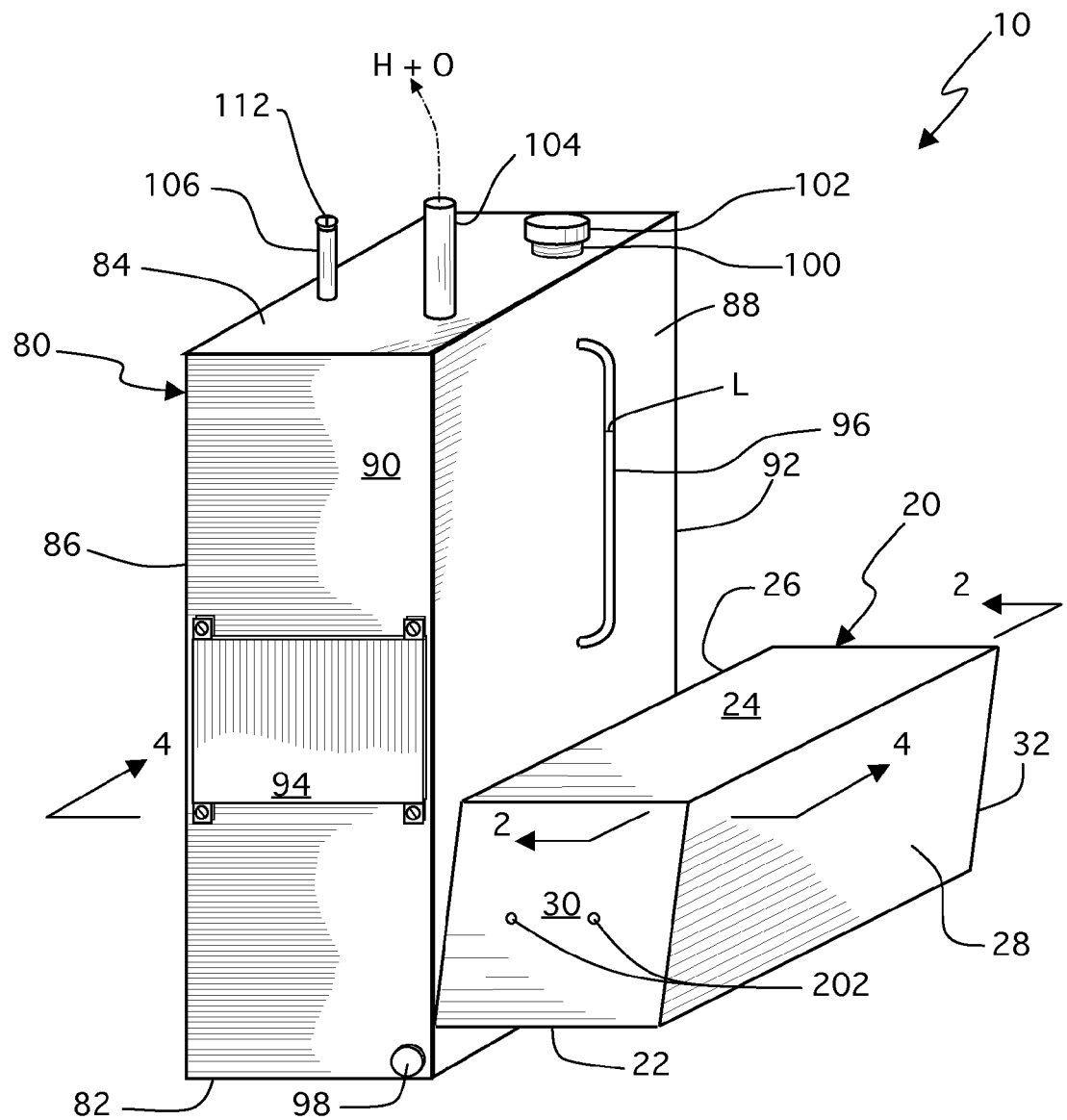
FIG. 1 represents an isometric view of a hydrogen system for internal combustion engine, object of the present application.

Referring now to the drawings, the present invention is generally referred to with numeral 10. It can be observed that it basically includes hydrogen generator 20 and housing assembly 80.

Figure 2:
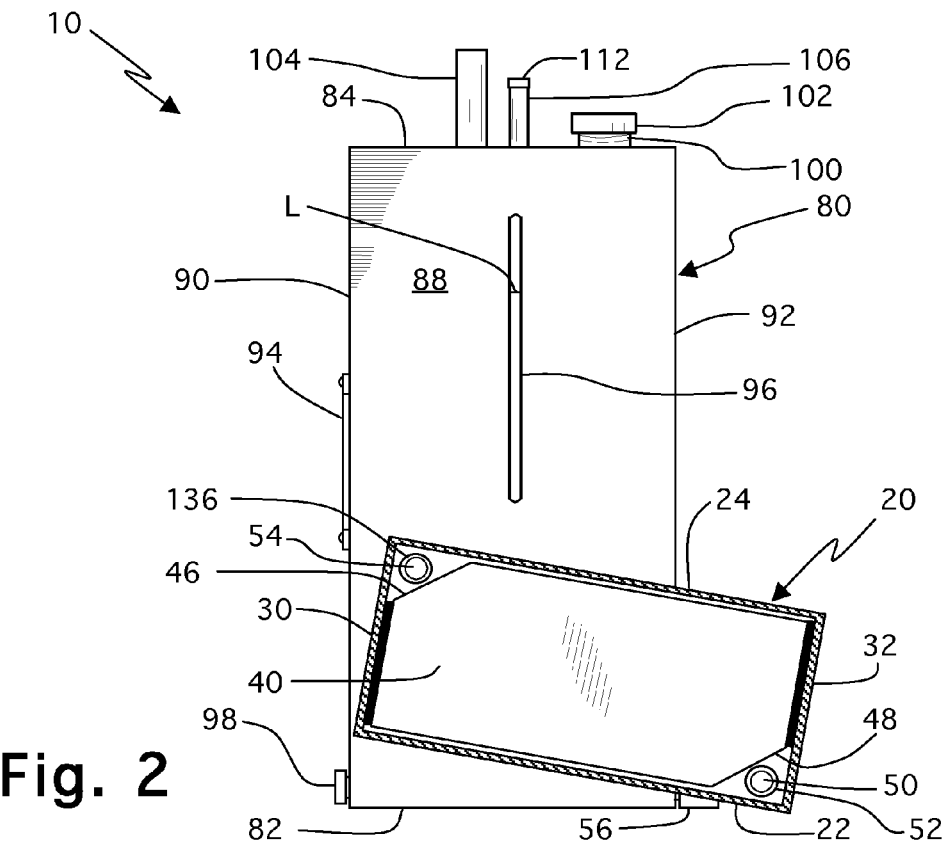
FIG. 2 is a cross-section view of the present invention, taken along lines 2-2 as seen in FIG. 1.

As seen in FIGS. 1 and 2, hydrogen generator 20 comprises base wall 22, top wall 24, lateral walls 26 and 28, front wall 30, and rear wall 32, and housing assembly 80 comprises base wall 82, top wall 84, lateral walls 86 and 88, front wall 90, and rear wall 92. Extending from top wall 84, housing assembly 80 further comprises intake neck 100 having cap 102 securely fastened thereon, outlet pipe 104, and air pipe 106. Exteriorly and vertically mounted onto lateral wall 88, housing assembly 80 further comprises sight tube 96. In the preferred embodiment, sight tube 96 is transparent to view level L of liquid matter therein, defined as aqueous solution AS. Aqueous solution AS can be water. Exteriorly mounted onto front wall 90, housing assembly 80 further comprises access plate 94 to access components within, and drain cap 98. Drain cap 98 covers a drain line, not shown, in the event that any or all said liquid matter needs to be removed from within instant invention 10.

As best seen in FIG. 2, it is important to note that hydrogen generator 20 is mounted onto housing assembly 80 at a predetermined angle. In an embodiment, the predetermined angle is in between 5 degrees and 45 degrees. However, in the preferred embodiment, the predetermined angle is in between 8 degrees and 20 degrees. In addition, it is also important to note that all of the plates (negative charged plates 40, neutral plates 42, and positive charged plates 44), although in this view only one negative charged plate 40 is illustrated, comprise diagonal edges 46 and 48. Diagonal edges 46 and 48 exist to allow room for inlet connecting tube 52 within inlet 50 and connecting tube 136 within outlet 54. In a preferred embodiment, inlet connecting tube 52 is positioned in a lower-most section of hydrogen generator 20, and connecting tube 136 is positioned in an upper-most section of hydrogen generator 20. As positioned, inlet connecting tube 52 is diagonally opposite to connecting tube 136. In addition, all of the plates (negative charged plates 40, neutral plates 42, and positive charged plates 44), although in this view only one negative charged plate 40 is illustrated, are fixed onto interior faces of front wall 30 and rear wall 32, and in a preferred embodiment, are welded onto interior faces of front wall 30 and rear wall 32. Furthermore, a first clearance exists between an interior face of top wall 24 and a top end of all of the plates (negative charged plates 40, neutral plates 42, and positive charged plates 44), although in this view only one negative charged plate 40 is illustrated, and a second clearance exists between an interior face of base wall 22 and a bottom end of all of the plates. In an embodiment, hydrogen generator 20 operates between 3-7 Ampere, and preferably at approximately 5-Ampere.

Figure 3:
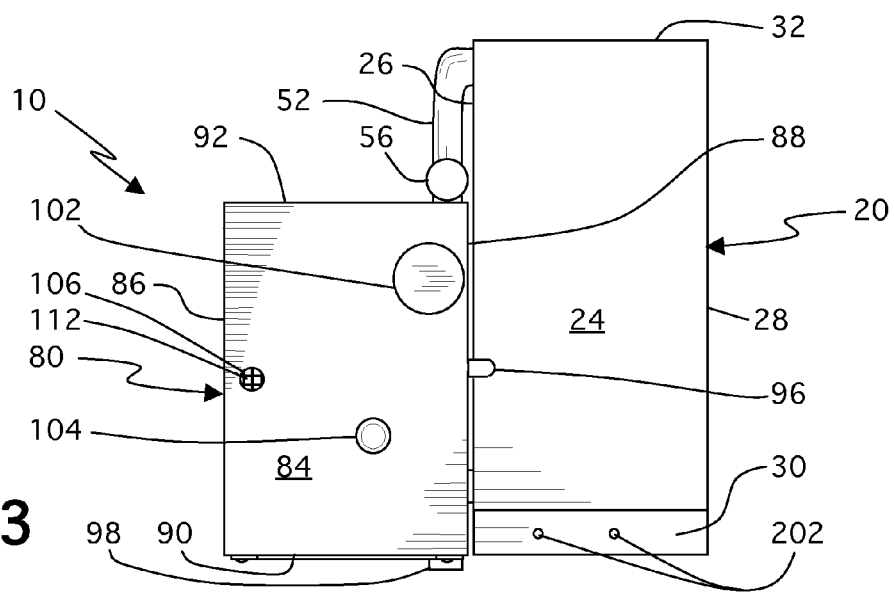
FIG. 3 is a top plan view of the present invention.

As best seen in FIG. 3, inlet connecting tube 52 extends from hydrogen generator 20 to housing assembly 80. Inlet connecting tube 52 comprises water pump 56 mounted thereon. Water pump 56 may be regulated to increase water flow to hydrogen generator 20 from housing assembly 80, resulting in faster oxygen O and hydrogen gas H production.

Figure 4:
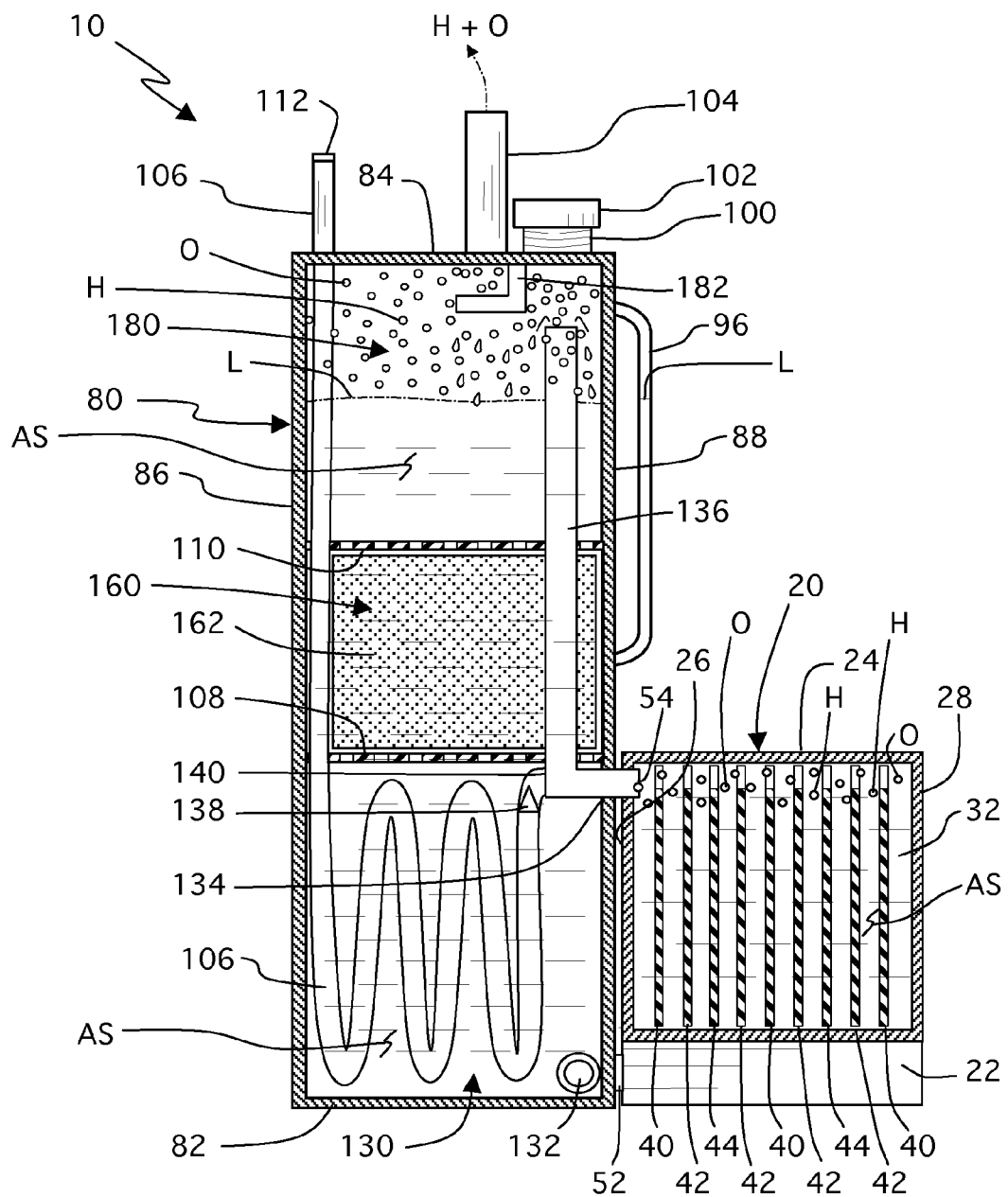
FIG. 4 is a cross-section view of the present invention, taken along lines 4-4 as seen in FIG. 1.

As best seen in FIG. 4, hydrogen generator 20 comprises a plurality of plates. Such plates include negative charged plates 40, neutral plates 42, and positive charged plates 44. In the preferred embodiment, said plates are in a specific order and comprise a specific number of plates. Said specific order is: negative charged plate 40; neutral plate 42; positive charged plate 44; neutral plate 42; negative charged plate 40; neutral plate 42; positive charged plate 44; neutral plate 42; and negative charged plate 40. It is noted that said order is identical as from left-to-right, and right-to-left.

Housing assembly 80 comprises three internal chambers divided by two dividing plates defined as lower dividing plate 108 and upper dividing plate 110. Lower dividing plate 108 and upper dividing plate 110 comprise a plurality of through holes to allow aqueous solution AS to flow and circulate through the three internal chambers.

The lower-most chamber is defined as cooling chamber 130. At its base, cooling chamber 130 comprises outlet 132. Above outlet 132, cooling chamber 130 comprises hole 134 to allow connecting tube 136 to extend therethrough. Connecting tube 136 extends from the upper-most section of hydrogen generator 20, and extends upwardly through filter chamber 160 to upper chamber 180. Air pipe 106 extends downwardly through upper chamber 180, through filter chamber 160 to cooling chamber 130. In the preferred embodiment, air pipe 106 coils or bends in shape to increase its total length within cooling chamber 130. Air pipe 106 comprises air filter 112.

Filter chamber 160 is positioned in between lower dividing plate 108 and upper dividing plate 110, and it houses filter 162. Filter 162 may be of any material adequate to trap foreign matter that accumulates or develops within aqueous solution AS as warmer aqueous solution AS circulates upwardly from cooling chamber 130 to upper chamber 180. Such a material can be cotton as an example. Upper chamber 180 comprises diverter 182.

Figure 5:
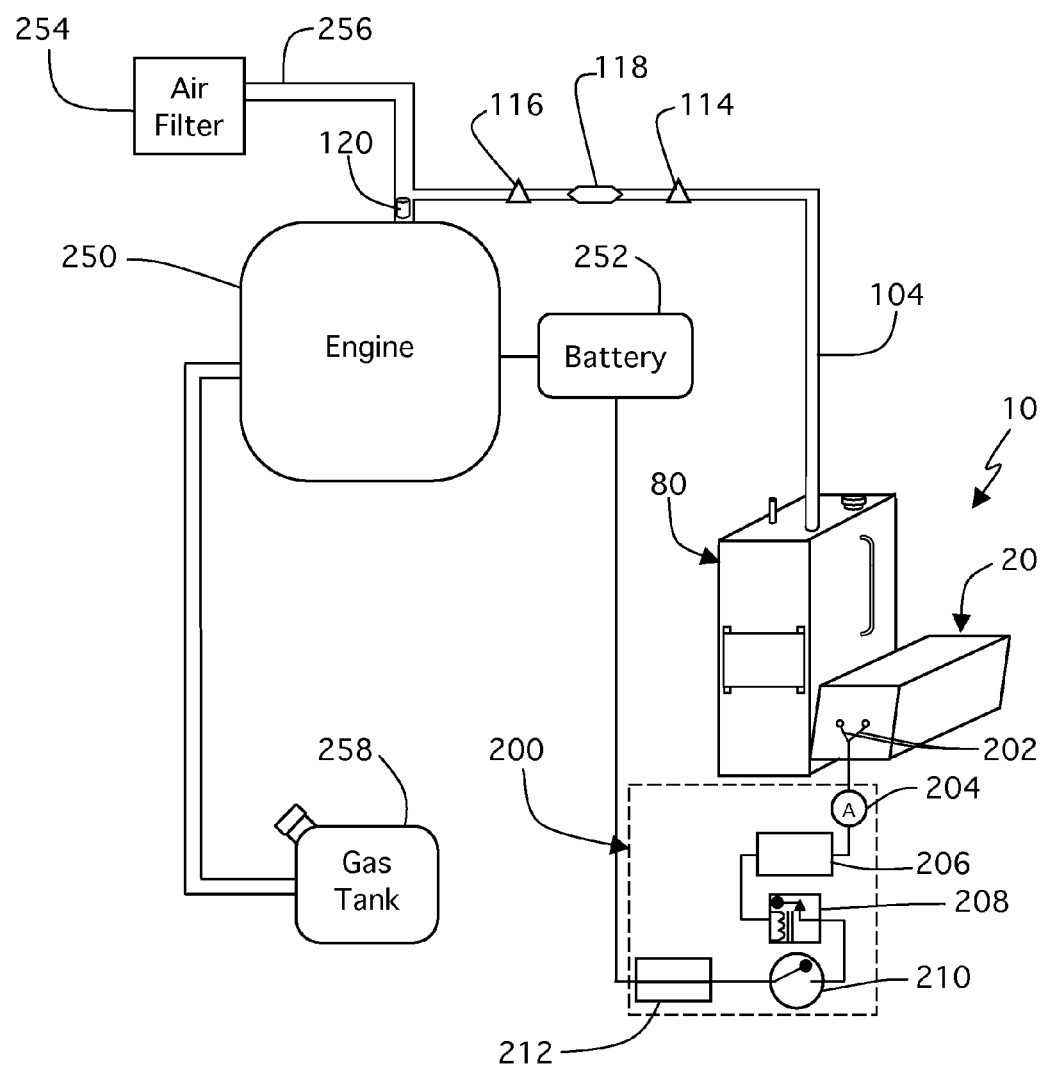
FIG. 5 is a block diagram of the present invention installed onto a vehicle having an internal combustion engine.

As seen in FIG. 5, instant invention 10 is connected to internal combustion engine 250. Although not illustrated, it is understood that a vehicle comprises battery 252 as a power source, air filter 254, and fuel tank 258. Air line 256 extends from air filter 254 to internal combustion engine 250. Air line 256 mounts onto internal sleeve 120, which in turn mounts onto or into a receiving element, not shown, of internal combustion engine 250. Internal sleeve 120 serves as a safety device, whereby air line 256 will disconnect from the receiving element in the event of a flashback from internal combustion engine 250. Outlet pipe 104 comprises one-way valves, defined as check valves 114 and 116. Positioned in between check valves 114 and 116 is flashback arrestor 118. Flashback arrestor 118 serves as a safety device in the event of a flashback from internal combustion engine 250. Electrical system 200 comprises at least electrical leads 202 that extend from hydrogen generator 20, ammeter 204, voltage regulator 206, relay 208, switch 210, and thermal fuse 212.

As seen in FIGS. 4 and 5, in operation instant invention 10 is filled with a predetermined amount of aqueous solution AS that is visible through sight tube 96. Instant invention 10 comprises sufficient aqueous solution AS whereby level L is above upper dividing plate 110, but below the uppermost end of connecting tube 136 as illustrated in FIG. 4. Instant invention 10 generates oxygen O and hydrogen gas H for use in internal combustion engine 250 to improve combustion efficiency and to decrease emissions, whereby hydrogen generator 20 serves as an electrolysis cell to generate the oxygen O and hydrogen gas H with electric current from battery 252 being passed through aqueous solution AS.

Cooling chamber 130 maintains a desired temperature within instant invention 10 to obtain desired quantities of oxygen O and hydrogen gas H for operation of internal combustion engine 250, whereby ambient air enters air pipe 106. The ambient air within air pipe 106 functions to cool the aqueous solution AS within housing assembly 80, and more specifically cooling chamber 130. Air pipe 106 comprises a one-way valve, defined as check valve 138. As the temperature of the ambient air increases therein, it escapes through connection 140.

Hydrogen generator 20 comprises negative charged plates 40, neutral plates 42, and positive charged plates 44, while leaving adequate room to allow free flow of aqueous solution AS between them. High purity electrolyte and substantially non-reactive electrodes result in improved electrolysis. Hydrogen generator 20 initially produces oxygen O and hydrogen gas H. Since hydrogen generator 20 is mounted onto housing assembly 80 at a predetermined angle, oxygen O and hydrogen gas H travel upwardly therein and escape via outlet 54 and into connecting tube 136. Once within connecting tube 136, oxygen O and hydrogen gas H naturally travel in an upward direction and are assisted by the warmer ambient air escaping through connection 140. Oxygen O and hydrogen gas H continue traveling upwardly and escape connecting tube 136. Oxygen O and hydrogen gas H then escape through outlet pipe 104, through check valve 114, flashback arrestor 118, check valve 116 and finally merges with incoming air from within air line 256 and into internal combustion engine 250.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A hydrogen system for internal combustion engines, comprising:
    A) a housing assembly comprising at least three internal chambers divided by at least two dividing plates, said at least two dividing plates include a lower dividing plate and an upper dividing plate, each comprising a plurality of through holes to allow an aqueous solution to flow and circulate through said at least three internal chambers; and
    B) a hydrogen generator that is mounted onto said housing assembly at a predetermined angle, said predetermined angle being such that said hydrogen generator is inclined relative to said housing assembly, said hydrogen generator comprises a first predetermined number of negative charged plates, a second predetermined number of neutral plates, and a third predetermined number of positive charged plates, said hydrogen generator further comprises an inlet and an outlet, said inlet positioned below said outlet, said hydrogen generator generates oxygen and hydrogen gas for use in an internal combustion engine to improve combustion efficiency and to decrease emissions, said hydrogen generator serves as an electrolysis cell to generate said oxygen and hydrogen gas with electric current from a power source being passed through said aqueous solution.

2. The hydrogen system for internal combustion engines set forth in claim 1, further characterized in that said first predetermined number of negative charged plates, said second predetermined number of neutral plates, and said third predetermined number of positive charged plates all comprise first and second diagonal edges, said first and second diagonal edges are positioned diagonally opposite to each other.

3. The hydrogen system for internal combustion engines set forth in claim 1, further characterized in that said hydrogen generator comprises a first wall, said first predetermined number of negative charged plates, said second predetermined number of neutral plates, and said third predetermined number of positive charged plates are all fixed onto a first interior face of said first wall.

4. The hydrogen system for internal combustion engines set forth in claim 3, further characterized in that said hydrogen generator comprises a second wall, said first predetermined number of negative charged plates, said second predetermined number of neutral plates, and said third predetermined number of positive charged plates are all fixed onto a second interior face of said second wall.

5. The hydrogen system for internal combustion engines set forth in claim 4, further characterized in that said hydrogen generator comprises a third wall, said first predetermined number of negative charged plates, said second predetermined number of neutral plates, and said third predetermined number of positive charged plates are a first predetermined distance from said third wall.

6. The hydrogen system for internal combustion engines set forth in claim 5, further characterized in that said hydrogen generator comprises a fourth wall, said first predetermined number of negative charged plates, said second predetermined number of neutral plates, and said third predetermined number of positive charged plates are a second predetermined distance from said fourth wall.

7. The hydrogen system for internal combustion engines set forth in claim 6, further characterized in that said inlet is positioned adjacent to a first diagonal edge.

8. The hydrogen system for internal combustion engines set forth in claim 7, further characterized in that said outlet is positioned adjacent to a second diagonal edge.

9. The hydrogen system for internal combustion engines set forth in claim 8, further characterized in that said hydrogen generator comprises a first connecting tube extending from said inlet to said housing assembly.

10. The hydrogen system for internal combustion engines set forth in claim 9, further characterized in that said housing assembly comprises a second connecting tube extending from said housing assembly to said outlet, and an outlet pipe that connects to said internal combustion engine.

11. The hydrogen system for internal combustion engines set forth in claim 1, further characterized in that said at least three internal chambers are a cooling chamber positioned below a filter chamber that is positioned below an upper chamber.

12. The hydrogen system for internal combustion engines set forth in claim 11, further characterized in that said housing assembly comprises an air pipe that extends downwardly through said upper chamber, through said filter chamber and to said cooling chamber, said air pipe coils or bends in shape to increase its total length within said cooling chamber, said air pipe contains ambient air to cool said aqueous solution within said housing assembly, and more specifically within said cooling chamber.

13. The hydrogen system for internal combustion engines set forth in claim 11, further characterized in that said filter chamber is positioned in between said lower dividing plate and said upper dividing plate, and it houses a filter to trap foreign matter that accumulates or develops within said aqueous solution as warmer aqueous solution circulates upwardly from said cooling chamber to said upper chamber.

14. The hydrogen system for internal combustion engines set forth in claim 11, further characterized in that said upper chamber comprises a diverter.

15. A hydrogen system for internal combustion engines, comprising:
A) a housing assembly comprising at least three internal chambers divided by at least two dividing plates, said at least two dividing plates include a lower dividing plate and an upper dividing plate, each comprising a plurality of through holes to allow an aqueous solution to flow and circulate through said at least three internal chambers, said at least three internal chambers are a cooling chamber positioned below a filter chamber that is positioned below an upper chamber; and
B) a hydrogen generator that is mounted onto said housing assembly at a predetermined angle, said predetermined angle being such that said hydrogen generator is inclined relative to said housing assembly said hydrogen generator comprises a first predetermined number of negative charged plates, a second predetermined number of neutral plates, and a third predetermined number of positive charged plates that all comprise first and second diagonal edges, said first and second diagonal edges are positioned diagonally opposite to each other, said hydrogen generator comprises an inlet positioned adjacent to said first diagonal edge and an outlet positioned adjacent to said second diagonal edge, said inlet positioned below said outlet, said hydrogen generator generates oxygen and hydrogen gas for use in an internal combustion engine to improve combustion efficiency and to decrease emissions, said hydrogen generator serves as an electrolysis cell to generate said oxygen and hydrogen gas with electric current from a power source being passed through said aqueous solution.

16. The hydrogen system for internal combustion engines set forth in claim 15, further characterized in that said hydrogen generator comprises a first wall, said first predetermined number of negative charged plates, said second predetermined number of neutral plates, and said third predetermined number of positive charged plates are all are fixed onto a first interior face of said first wall, and said hydrogen generator comprises a second wall, said first predetermined number of negative charged plates, said second predetermined number of neutral plates, and said third predetermined number of positive charged plates are all are fixed onto a second interior face of said second wall.

17. The hydrogen system for internal combustion engines set forth in claim 16, further characterized in that said hydrogen generator comprises a third wall, said first predetermined number of negative charged plates, said second predetermined number of neutral plates, and said third predetermined number of positive charged plates are a first predetermined distance from said third wall, and said hydrogen generator comprises a fourth wall, said first predetermined number of negative charged plates, said second predetermined number of neutral plates, and said third predetermined number of positive charged plates are a second predetermined distance from said fourth wall.

18. The hydrogen system for internal combustion engines set forth in claim 17, further characterized in that said hydrogen generator comprises a first connecting tube extending from said inlet to said housing assembly.

19. The hydrogen system for internal combustion engines set forth in claim 18, further characterized in that said housing assembly comprises a second connecting tube extending from said housing assembly to said outlet, and an outlet pipe that connects to said internal combustion engine.

20. The hydrogen system for internal combustion engines set forth in claim 19, further characterized in that said housing assembly comprises an air pipe that extends downwardly through said upper chamber, through said filter chamber and to said cooling chamber, said air pipe coils or bends in shape to increase its total length within said cooling chamber, said air pipe contains ambient air to cool said aqueous solution within said housing assembly, and more specifically within said cooling chamber, said filter chamber is positioned in between said lower dividing plate and said upper dividing plate, and it houses a filter to trap foreign matter that accumulates or develops within said aqueous solution as warmer said aqueous solution circulates upwardly from said cooling chamber to said upper chamber.

* * * * *